United States Patent [19]

Fitton

[11] Patent Number: 5,505,783
[45] Date of Patent: Apr. 9, 1996

[54] STARCH ESTERS

[75] Inventor: Michael G. Fitton, Brussels, Belgium

[73] Assignee: Cerestar Holding B.V., Holland, Netherlands

[21] Appl. No.: 162,907

[22] Filed: Dec. 8, 1993

Related U.S. Application Data

[63] Continuation of Ser. No. 857,452, Mar. 25, 1992, abandoned.

[30] Foreign Application Priority Data

Mar. 27, 1991 [GB] United Kingdom ............ 9106569

[51] Int. Cl.$^6$ ............ C08B 30/00; C08L 3/00; C09D 101/00; A23L 1/05
[52] U.S. Cl. ............ 127/65; 127/70; 127/71; 106/210; 106/213; 426/661; 426/658; 426/578
[58] Field of Search ............ 127/65, 70, 71; 106/210, 213; 426/661, 658, 578

[56] References Cited

U.S. PATENT DOCUMENTS

| | | | |
|---|---|---|---|
| 2,661,349 | 12/1953 | Caldwell et al. | 252/356 |
| 3,137,592 | 6/1964 | Protzman et al. | 127/71 |
| 3,456,838 | 7/1969 | Marotta | 252/316 |
| 4,035,235 | 7/1977 | Richards | 426/96 |
| 4,977,252 | 12/1990 | Chiu | 536/102 |
| 5,185,176 | 2/1993 | Chiu | 426/651 |
| 5,275,837 | 1/1994 | Eastman | 426/661 |

OTHER PUBLICATIONS

"Gelatinization of Starch in Extruded Products", Chiang, et al *Cereal Chemistry* 1977 (month not available) pp. 436–443.
Patent Abstracts of Japan vol. 11, No. 176, 5 Jun. 1987 JP–A–62 003748 (abstract).
WPIL, AN 88–115435 17 Mar. 1988 (abstract).
"Extrusion Cooking of Starches for Semi–Products", W. Wiedmann *Starke* vol. 10, No. 39, 1987 (month not available), pp. 352–357.
Cereal Chemistry, vol. 54, No. 3, 1977, B. Y. Chiang, Abstract and pp. 442–443 (No Month) 1977.
Patent Abstracts of Japan, vol. 11, No. 176, (C–426)(2623) 5 Jun. 1987 & Jp–A–62 003 748.
World Patent Index Latest Section Ch, Week 8817 & Jp–A–63 061–001 Jan. 1986.

*Primary Examiner*—Paul Lieberman
*Assistant Examiner*—Patricia L. Hailey
*Attorney, Agent, or Firm*—Cushman Darby & Cushman

[57] ABSTRACT

A process for the production of a cold-water dispersible, starch half ester of a hydrocarboxyl-substituted succinic or glutaric acid, particularly the starch half ester of n-octenylsuccinic acid, includes the step of gelatinising and partially degrading the granular starch half ester, preformed in a manner known per se, by heating the half ester under shearing conditions, e.g. in an extruder, in the presence of water. Milling of the product gives a fine powder which is more readily dispersible in water to give a lump-free dispersion than is the alternative roll-dried ester.

8 Claims, No Drawings

STARCH ESTERS

This is a continuation of application Ser. No. 07/857,452, filed on Mar. 25, 1992, which was abandoned upon the filing hereof.

The present invention relates to the production of starch half esters of substituted, succinic and glutaric acids, in particular to the production of the starch half ester of n-octenyl succinic acid.

The preparation, properties and uses of starch half esters of substituted, succinic and glutaric acids has been known for many years see, for example, U.S. Pat. No. 2,661,349 issued in 1953. A methylene group of the ester bears a long chain hydrocarbon group and the esters are thereby characterised by the presence in the molecule of hydrophobic and hydrophilic groups which give them interesting emulsifying properties. One such ester, the starch half ester of n-octenyl succinic acid, is permitted for use in foods where it finds wide application as an emulsifier especially as a partial or total substitute for various naturally-occurring gums e.g. gum arabic, guar gum, locust bean gum etc. Gum arabic is widely used for stabilising low viscosity oil-in-water food emulsions, especially those intended to be frozen for storage and thus finds applications in syrups, ice-cream and beverages.

Gum arabic is the dried, refined, exudate obtained from various species of trees of the genus Acacia of the Leguminosae family which are found in the tropical and semitropical areas of the world. The most important producing areas are the Republic of the Sudan and some of the countries in West Africa. Unfortunately, these areas of the world are subject to climatic and political uncertainties which can lead to reductions or interruptions in the supply of the product. There has been therefore a considerable incentive to find a total or partial replacement for gum arabic in at least some of its applications and the starch half ester of n-octenyl succinic acid has been and is, extensively used for this purpose.

Starch half esters of substituted succinic and glutaric acids including the half ester of n-octenyl succinic acid are typically made by reacting granular native starch with the substituted succinic or glutaric acid chloride or anhydride, usually the latter. The reaction is carried out in an aqueous alkaline medium at a temperature slightly higher than ambient but lower than that at which the starch gelatinises. In this way a granular product is obtained which may readily be washed and dried. The granular starch half ester is not however soluble in water and before it can be made to exhibit its full emulsification potential it must be gelatinised. Even when gelatinised, the starch half esters tend, at the concentration levels at which they are used, to make an aqueous medium too viscous so it is desirable to degrade slightly the starch moiety of the half ester.

The degradation of the starch may be achieved by "acid-thinning" which can give a range of product viscosities by the appropriate choice of processing conditions. Acid thinning does not however gelatinise the starch for which an additional process step is required, conventionally for example, by passing a slurry of the starch half ester over heated rollers. "Roll drying" as this process is called suffers however from the disadvantage that the dried product is flake-like and, owing to the high surface area to volume ratio of the flakes, disperses in water only with difficulty, and is prone to lump formation. In use, the addition of other dispersants is frequently necessary to obtain a lump-free dispersion.

A second method of degrading the starch of the starch half ester uses enzymes such as beta-amylase which splits off maltose from the starch molecule so reducing its molecular weight. The enzymatic method however is expensive and inconvenient because it requires the gelatinisation of the starch at a low concentration prior to the enzyme treatment. The excess water then places an added burden on the drying process.

We have now found a means whereby the granular product of the starch half ester production process may be degraded and gelatinised in a single stage to give a product which, after milling to a fine powder, is readily dispersible in water to give a lump-free dispersion.

According to the invention therefore a process for the production of a cold-water dispersible, starch half ester of a substituted, succinic or glutaric acid is characterised in that the granular starch half ester, preformed in a manner known per se, is gelatinised and partially degraded by heating under shearing conditions in the presence of water.

After gelatinisation and partial degradation the half ester may be milled to produce a product having a particle size less than 300 microns preferably 50 to 200 microns. The particles produced by milling have a three dimensional irregular shape unlike those obtained by roll drying or spray drying and it is this shape which contributes to their dispersibility in aqueous systems.

The shearing conditions are preferably provided by an extruder in which one or more screws convey the starch half ester along a heated barrel in which the starch half ester is subjected to shearing forces. The product leaves the extruder through a die and is milled to give a free flowing white powder. The shear forces applied to the starch half ester result from the combined effect of the extruder construction and process parameters, i.e. screw geometry, rotation speed, temperature, die size and the moisture content of the starch half ester. The most important of these are the water content of the starch half ester, which is preferably 5% to 30% by weight, more preferably 10% to 25% by weight, and the elevated temperature in the extruder. It is preferred that the temperature of the extruder barrel lies in the range 120° to 200° C., particularly about 140° to 180° C. In general, we have found that the most effective products are obtained when the extrusion is carried out under "high water" "low temperature" conditions chosen from the ranges given above e.g. at a temperature between 140° and 160° C. and with an amount of water in the range 20 to 25% based on starch half ester.

The known method for producing the starch half ester of the substituted, succinic or glutaric acid involves treatment of granular native or modified starch in an aqueous slurry at 30° C. with the equivalent succinic or glutaric acid anhydride while maintaining a pH of 8.0 to 8.5 by the simultaneous addition of alkali such as sodium hydroxide. Treatment levels range from 1% to 4% of the substituted anhydride on starch dry basis. The reaction time ranges from one to several hours after which the granular product is washed and dried.

Most starches are suitable for use in the process of the invention e.g. maize starch, wheat starch, potato or tapioca starches although waxy maize starch is generally preferred. A modified starch may also be used in the process eg. an oxidised starch but it is more usual to use an unmodified, native starch particularly when a food-grade emulsifier is required.

The substituent in the starch half ester is suitably a long chain hydrocarbon radical having 5 to 18 carbon atoms and the preferred starch half ester for use in the process of the invention is the starch half ester of n-octenyl succinic acid, since this product is already known to the food industry and permitted for use therein. This starch half ester when produced by the process of the invention gives a product which has an excellent dispersibility in water, gives a very low incidence of phase separation in a classical oil-in-water system and, because it is produced by an entirely "physical" process, does not require the additional use of acids, enzymes or chemical adjuncts.

The invention will now be further illustrated by reference to the following Examples in which samples of granular starch half ester of n-octenyl succinic acid were prepared by reacting waxy maize starch with 1 to 4% by weight on starch dry basis of n-octenyl succinic acid anhydride maintaining the reaction at pH 8.0 to 8.5 by the addition of sodium hydroxide solution (3.5% by weight). After a reaction time of one hour the products were washed with water and dried.

Various amounts of water were added to samples of the preparation process described above and each sample was extruded in a twin screw (co-rotating) extruder at a barrel temperature of 120° to 200° C. through a die of 8 mm diameter delivering 25 kg product/hour. After extrusion the products were milled in a Bauermeister mill to give a fine powder of particle size 50 to 200 microns. The following Table gives the extrusion parameters for Examples 1 to 12.

| Example No | % n-octenyl succinic anhydride* | Water content | Temperature | Extruder screw speed |
|---|---|---|---|---|
| 1 | 1 | 14 | 200 | 150 |
| 2 | 1 | 19 | 180 | 120 |
| 3 | 1 | 25 | 140 | 100 |
| 4 | 2 | 14 | 200 | 150 |
| 5 | 2 | 19 | 180 | 120 |
| 6 | 2 | 25 | 140 | 100 |
| 7 | 3 | 14 | 200 | 150 |
| 8 | 3 | 19 | 180 | 120 |
| 9 | 3 | 25 | 140 | 100 |
| 10 | 4 | 14 | 200 | 150 |
| 11 | 4 | 19 | 180 | 120 |
| 12 | 4 | 25 | 140 | 100 |

*% of n-octenyl succinic anhydride used in the preparation of the starch half ester.

The emulsifying properties of the various samples were determined as follows:

Two 400 ml beakers were provided with 50 g maize oil and 150 g water respectively. To the water was added a test emulsifier as indicated below at the concentration of 0.5% by weight dry substance based on the weight of oil plus water and the water was stirred with a Silverson mixer at 6000 rpm for one minute. While still stirring at 6000 rpm the oil was poured into the water over a period of one minute and the stirring continued for a further 3 minutes still at 6000 rpm. The emulsion obtained was then used to fill a 100 ml measuring cylinder which was allowed to stand, the phase separation being measured and recorded as a function of time.

The results of the products characterised 1 to 12 above compared with gum arabic are given below.

| Product from Example | Emulsion phase separation (volume in mls oil plus water separated after 20 hours) |
|---|---|
| 1 | 75 |
| 3 | 70 |
| 4 | 67.5 |
| 6 | 57 |
| 7 | 63.75 |
| 9 | 54 |
| 10 | 64 |
| 12 | 61 |
| Gum Arabic | 59 |

I claim:

1. A physical process for the production of an emulsifier replacement for gum arabic, said process being free from added chemical components, which comprises heating the waxy maize starch half ester of n-octenyl succinic acid in the presence of water under shearing conditions to degrade said waxy maize starch half ester of n-octenyl succinic acid sufficiently to produce a product which, after milling to a fine powder, is readily dispersible in cold water to give a lump free dispersion of suitable viscosity, and then milling the so-produced degraded waxy maize starch half ester to a particle size of 50 to 200 microns so as to provide said product which is readily dispersible in water to give a lump-free dispersion.

2. A process as set forth in claim 1 in which the waxy maize starch half ester of n-octenyl succinic acid is heated under shearing conditions in an extruder.

3. A process as set forth in claim 2 in which the temperature in the barrel of the extruder is 120° to 200° C.

4. A process as set forth in claim 3 in which the temperature in the barrel of the extruder is 140° to 180° C.

5. A process as set forth in claim 2 in which the temperature in the barrel of the extruder is 140° to 160° C. and the water content of said waxy maize starch half ester is 20% to 25% by weight.

6. A process as set forth in claim 1 in which the water content of said waxy maize starch half ester is in the range 5% to 30% by weight.

7. A process as set forth in claim 6 in which the water content of said waxy maize starch half ester is in the range 10% to 25% by weight.

8. A physical process for the production of an emulsifier said process being free from added chemical components, which comprises heating the waxy maize starch half ester of a n-octenyl succinic acid in the presenced of water under shearing conditions to degrade said waxy maize starch half ester of n-octenyl succinic acid sufficiently to produce a product which, after milling to a fine powder, is readily dispersible in cold water to give a lump free dispersion, and then milling the so-produced degraded waxy maize starch half ester to a particle size of 50 to 200 microns so as to provide said product which is readily dispersible in water to give a lump-free dispersion.

* * * * *